United States Patent [19]
Nagaoka et al.

[11] B  4,001,879
[45]  Jan. 4, 1977

[54] AUTOMATIC HUE-CONTROL APPARATUS FOR COLOR TELEVISION RECEIVERS
[75] Inventors: Yoshitomi Nagaoka, Neyagawa; Michio Furuhashi, Osaka, both of Japan
[73] Assignee: Matsushita Electric Industrial Co., Ltd., Osaka, Japan
[22] Filed: Sept. 17, 1970
[21] Appl. No.: 73,017
[44] Published under the second Trial Voluntary Protest Program on March 9, 1976 as document No. B 73,017.
[30] Foreign Application Priority Data Sept. 20, 1969  Japan ............................ 44-74790
Sept. 20, 1969  Japan ............................ 44-74799
Sept. 20, 1969  Japan ............................ 44-75556
Apr. 20, 1970   Japan ............................ 45-34164
Apr. 20, 1970   Japan ............................ 45-34166

[52] U.S. Cl. .............................................. 358/28
[51] Int. Cl.² ...................................... H04N 9/12
[58] Field of Search .................. 178/5.4 HE; 358/28

[56] References Cited
UNITED STATES PATENTS 2,888,514  5/1959  Pritchard .................... 178/5.4 HE
3,525,802  8/1970  Whiteneir, Jr. ............. 178/5.4 HE OTHER PUBLICATIONS
"Automatic Controls for Color Television" by Z. Wiencek in Electronics May 15, 1959, pp. 58-59.

Primary Examiner—Robert L. Griffin
Assistant Examiner—Mitchell Saffian
Attorney, Agent, or Firm—Wenderoth, Lind & Ponack

[57] ABSTRACT

An automatic hue-control apparatus having an improved means to keep the color for flesh in the reproduced picture the same as the memory-color for flesh. The apparatus has a signal extracting means for extracting the signal components of the flesh color from the chrominance signals and which feeds these signal components to a phase error detecting means for detecting the phase error between the output signal of the signal extracting means and a reference signal which is in phase quadrature to the phase of the memory-color for flesh. The phase error detecting means produces an error signal indicative of the phase relation between the signals and supplies an output signal to a variable phase-shifting means which is controlled by the output signal of said phase error detecting means to correct the phase error between the chrominance signal and subcarrier reference signal.

13 Claims, 10 Drawing Figures

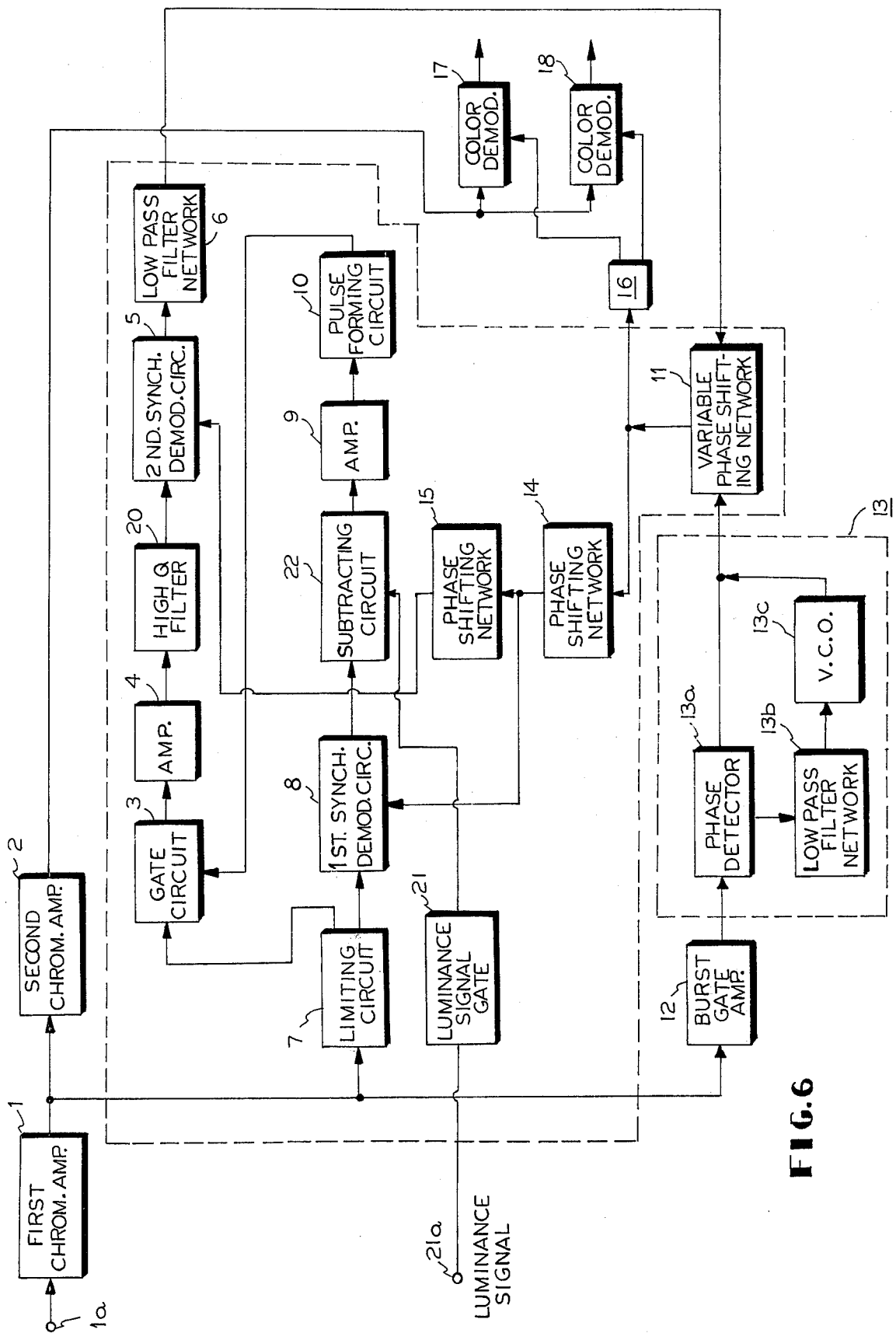

AUTOMATIC HUE-CONTROL APPARATUS FOR COLOR TELEVISION RECEIVERS

FIELD OF THE INVENTION

This invention relates to an automatic hue-control apparatus for color television receivers and in particular to an automatic hue-control apparatus for keeping the flesh color in the reproduced signal the same as the memory-color for flesh.

DESCRIPTION OF THE PRIOR ART

Color television systems are designed on the basis of the principles of colorimetry so that the same colors can be obtained in the reproduced pictures on tri-color tubes as are present in the original objects. However, when things occur in the transmitting stations which cause color changes, the hues in the reproduced picture are different from those in the original objects. Transmitting stations take pains to minimize the hue changes that occur when switching cameras or when going to film or video tape. It requires experienced technicians to set up all the cameras just exactly right and to make sure that film and video tape units produce precise colors. However, the adjustments which must be made by studio technicians depend on their subjective judgments and should be made at the moment when the input source is switched. Hence, there are some possibilities for color changes at these times.

On the other hand color television viewers are generally ignorant of the colors of the original objects and tolerate wide differences in their reproduction. But the well-known colors or memory-colors, such as flesh colors, are familiar to them, so that they are very sensitive to hue changes in these colors. Therefore, it is desirable that a few well-known colors be accurately reproduced, and this is especially true of flesh colors. In conventional receivers, manual hue- or tint-controls are provided for correcting errors in the hue of the reproduced picture. The viewers may have to adjust the hue-controls carefully using the flesh color as a reference so that the desired reproduction is obtained. But these adjustments are difficult and troublesome for many viewers because they have no definite reference.

As described in an article by C. J. Bartleson and C. P. Bray entitled "On the Preferred Reproduction of Flesh, Blue-Sky, and Green-Grass Colors" appearing in Photographic Science and Engineering, Volume 6, Number 1, January-February, 1959, Pages 19–25, the preferred color for reproduced flesh color is found to be the same hue as the memory-color for flesh and the preferred reproduction tends to have a more yellow hue than is common to natural flesh.

Therefore, it is desired that viewers not have to adjust the hue-control of the set and that the preferred color reproduction is maintained at all times, such as when they switch channels or when input sources are switched in the transmitting stations.

SUMMARY OF THE INVENTION

It is an object of this invention to provide a new automatic hue-control apparatus for color television receivers to eliminate the need for adjusting the manual hue-control of the set after programs change or when cameras are switched or when channels are switched. It is another object of this invention to provide a new method for keeping the reproduced color of flesh the same as the memory-color for flesh.

To achieve the foregoing objects, the automatic hue-control apparatus according to the present invention comprises a signal extracting means for extracting the signal components of the flesh color from the chrominance signals; a phase error detecting means coupled to said signal extracting means for detecting the phase error between the output signal of said signal extracting means and a reference signal which is in phase quadrature to the phase of the memory-color for flesh to produce an error signal indicative of the phase relation between these signals; and a variable phase-shifting means controlled by the output signal of said phase error detecting means to correct the phase error between the chrominance signal and a subcarrier reference signal. The variable phase-shifting means is designed to shift the phase of the burst signal or the subcarrier reference signal or the chrominance signal.

DESCRIPTION OF THE DRAWING

These and other features of the invention will be apparent from the following description of the invention in connection with the accompanying drawings, in which:

FIG. 6 is a schematic diagram of a transistorized automatic hue-control circuit in a color television receiver, showing one practical embodiment according to the principles of the present invention.

DESCRIPTION OF PREFERRED EMBODIMENTS

Figure 1:
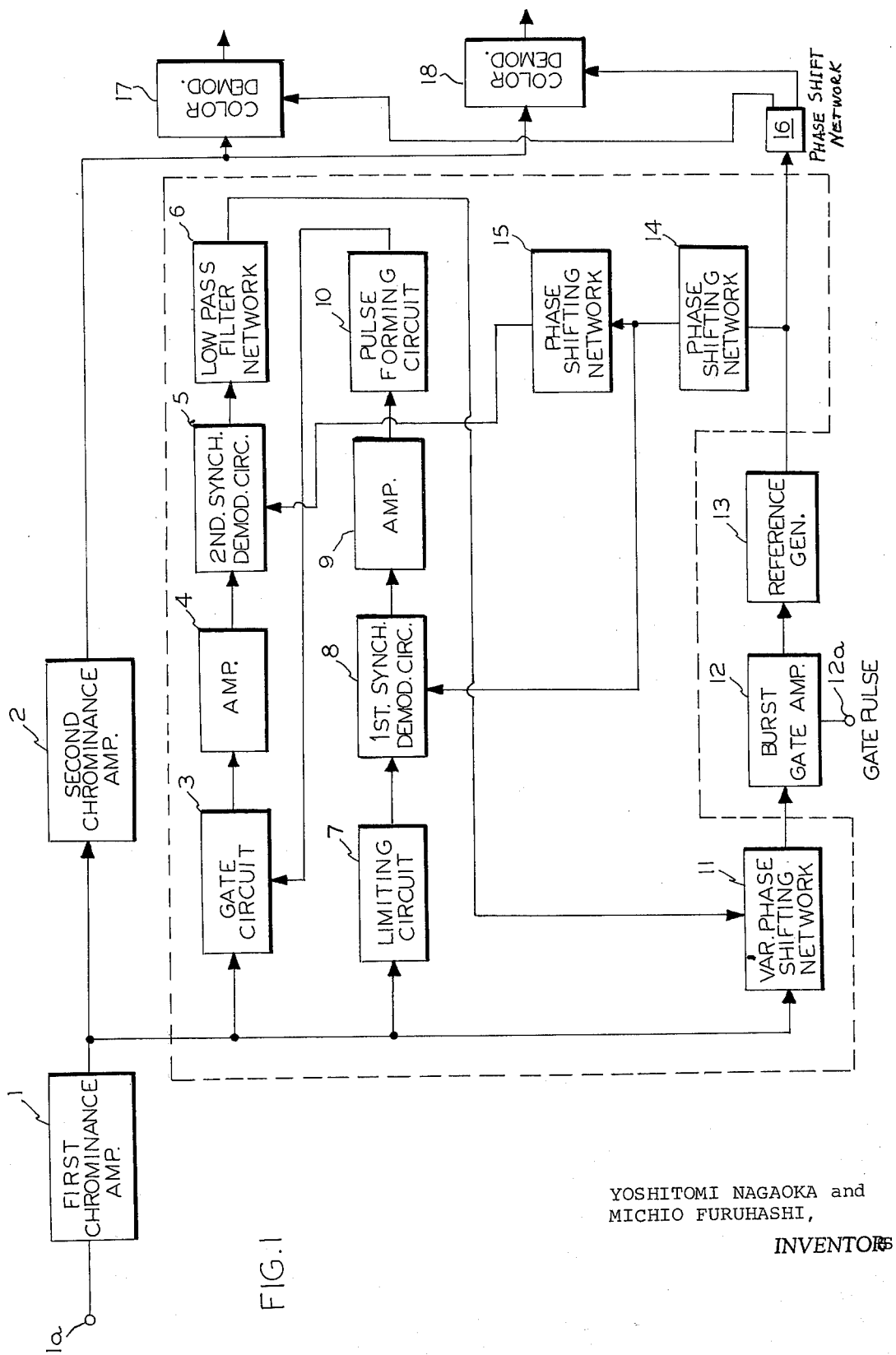
FIG. 1 is a block diagram of an embodiment of the automatic hue-control apparatus in accordance with the present invention.

FIG. 1 is a block diagram of an embodiment of the automatic hue-control apparatus, wherein the part surrounded by the dotted line is the new apparatus in accordance with the present invention. In this figure, the first chrominance amplifier 1 extracts a chrominance signal having an amplitude and a phase respectively decided by the color saturation and hue of the transmitted object from a composite color video signal. This composite color video signal is obtained in a television receiver from a television signal transmitted by a broadcast station. The output signal of said first chrominance amplifier 1 is divided among a gate circuit 3, a limiting circuit 7, and a variable phase-shifting network 11 and is also fed to color demodulators 17 and 18 through the second chrominance amplifier 2.

The limiting circuit 7 limits or suppresses the amplitude of chrominance signals having larger amplitudes than that of the chrominance signal for flesh color, and feeds the chrominance signals into a first synchronous demodulating circuit 8. This amplitude-limiting is necessary for detecting the presence of the flesh color. Said first synchronous demodulating circuit 8 detects only specific phase signal components by means of a reference signal supplied from a phase-shifting network 14. The detected output signal is fed into an amplifier 9. A pulse forming circuit 10 is coupled to said amplifier 9 and provides a control pulse for said gate circuit 3 in order to allow the transmission of the chrominance signal during the pulse duration. This pulse duration is a period of time that the input signal to said pulse forming circuit 10 exceeds a specific threshold level. The gated output signal of said gate circuit 3 is amplified by an amplifier 4 and is fed into the second synchronous demodulating circuit 5. Said second synchronous demodulating circuit 5 acts as a phase detector and is supplied a reference signal with a specific phase from phase-shifting network 15. The output of said second synchronous demodulating circuit 5 is fed through a low pass filter network 6 as a control signal into the variable phase-shifting network 11 as a voltage control therefor.

A part of the chrominance signal from said first chrominance amplifier 1 is phase-shifted in said voltage-controlled phase-shifting network 11 in accordance with the variation of the control signal from said low pass filter network 6. The phase-shifted chrominance signal is fed into a burst gate amplifier 12, wherein a color burst signal is extracted from said chrominance signal by means of a gate pulse applied through an input terminal 12a. Said color burst signal is converted into a continuous signal of identical frequency and phase in a conventional reference signal generator 13 which uses one of the three commonly known principal circuits, namely an automatic phase control (APC) circuit, an injection locked crystal oscillator circuit and a crystal ringing circuit, and is fed through a phase shift network 16 to color demodulators 17 and 18.

Figure 2A:
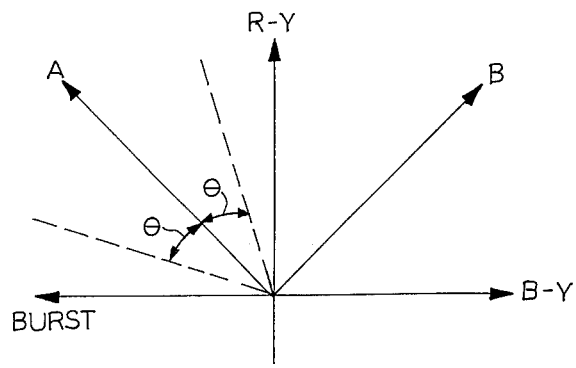
FIG. 2A is a phase diagram illustrating the demodulation axes of the reference signals which are fed to the synchronous demodulating circuits shown in the block diagram of FIG. 1.

The output signal of said reference generator 13 is also phase-shifted in the phase-shifting network 14 so as to coincide with the phase angle along the vector A, as shown in FIG. 2A. The output signal of said phase-shifting network 14 is divided between said first synchronous demodulating circuit 8 and the phase-shifting network 15. In said phase-shifting network 15, the phase of said output signal is again shifted for obtaining the same angle along the vector B, as shown in FIG. 2A.

Referring to FIG. 2A, there is shown a chrominance subcarrier phase diagram, which indicates the relationship between the phase of the color burst signal and the reference signals fed to each of the synchronous demodulating circuits 8 and 5. Vector A has a phase angle corresponding to the mean memory-color for flesh, while vector B lags 90° behind the phase angle corresponding to said mean memory-color for flesh.

Figure 2B:
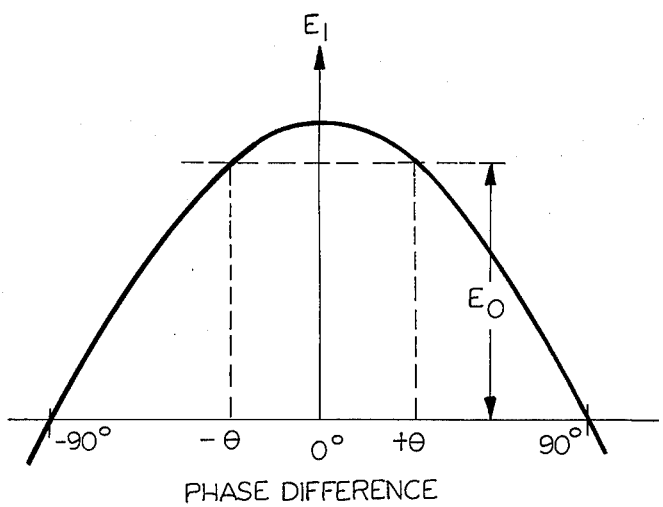
FIG. 2B is a graph illustrating the output variation of the synchronous demodulating circuit, acting as a phase detector, which is used in the block diagram of FIG. 1.

Referring to FIG. 2B, there is illustrated the output variation of said first synchronous demodulating circuit 8 versus the phase difference between the input chrominance signal and the reference signal which has a phase angle along said vector A. The horizontal dotted line in FIG. 2B indicates a threshold level in said pulse forming circuit 10, wherein input signals above the threshold level are converted into pulse signals, while those below the threshold level do not produce any output. The threshold level is established so as to satisfy the following conditions.

When the chrominance signal is the flesh color, that is, its phase lies within a narrow sector having said vector A at the center, as shown in FIG. 2A, the output $E_1$ of the first synchronous demodulating circuit 8 should be as follows:

$$E_1 > E_o \qquad (1)$$

where $E_o$ represents the threshold level, as shown in FIG. 2B. When the chrominance signal does not contain the hue of flesh color, the output $E_1$ should be as follows:

$$E_1 < E_o \qquad (2)$$

In the former case, said gate circuit 3 is keyed on when it receives the output pulse of said pulse forming circuit 10 and allows the transmission of only the corresponding chrominance signal with flesh colors to said second synchronous demodulating circuit 5 through said amplifier 4. Then said second synchronous demodulating circuit compares the phase of only the chrominance signal for flesh color with the reference signal lagging 90° from the signal corresponding to the mean memory-color for flesh, that is, a preferred color for flesh, and translates the phase difference into amplitude. This means that if the phase difference between the chrominance signal and the reference signal is exactly a right-angle, that is, 90°, the output $E_2$ of the second demodulating circuit is zero. However, if the phase of the chrominance signal leads or lags the reference signal, a positive or negative error signal is obtained, respectively.

The reference signal is a regenerated continuous signal of identical frequency and phase with the color burst signal. It is thus possible to control the phase of the reference signal by controlling the color burst signal. This control is achieved by said voltage-controlled phase-shifting network 11, to which the output error signal of the second demodulating circuit 5 is supplied through the low pass filter network 6. A positive error signal advances the color burst phase, so that the phase difference between the chrominance signal and the reference signal fed to the second demodulating circuit 5 is automatically kept at 90°. On the other hand, because the negative error signal delays the color burst phase, the phase difference between them is also kept at 90°. This feedback system which controls the color burst phase maintains the correct phase relation between the chrominance signal for flesh and the reference signal. This means that the color balance for flesh in the reproduced picture is kept at a preferred condition during the fluctuations of color, especially flesh tones.

In this feedback system, the D-C loop gain given by the product of the sensitivities of said second synchronous demodulating circuit 5 and the phase-shifting network 11 should be large enough to maintain less error than the minimum perceptible hue error in the reproduced picture.

Figure 3:
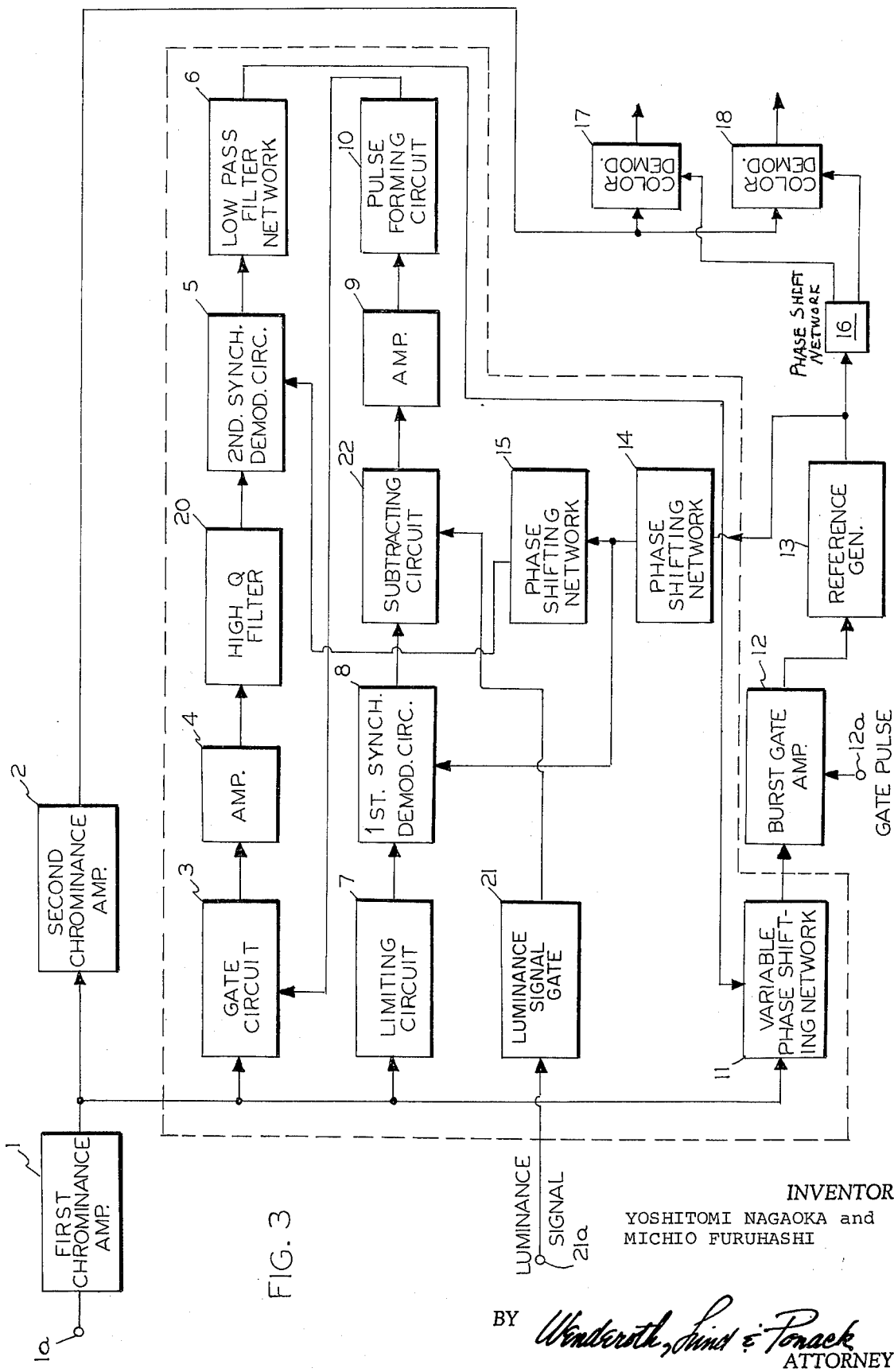
FIG. 3 is a block diagram similar to that of FIG. 1 of a modified circuit arrangement in accordance with the present invention.

FIG. 3 shows a somewhat modified block diagram of a circuit similar to that of FIG. 1, wherein identical reference characters designate identical blocks to those of FIG. 1. When a second synchronous demodulating circuit with a low sensitivity is used, an additional high Q filter 20 is provided for lengthening the duration of the gated chrominance signal which corresponds to the flesh color in a small area, for example, in a long-shot.

Figure 4A:
FIGS. 4A and 4B are graphs showing a gated chrominance signal applied to and the output waveform obtained from the high Q filter in FIG. 3.
Figure 4B:
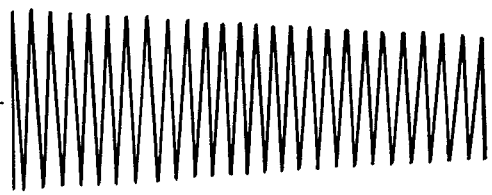
Figure 4C:
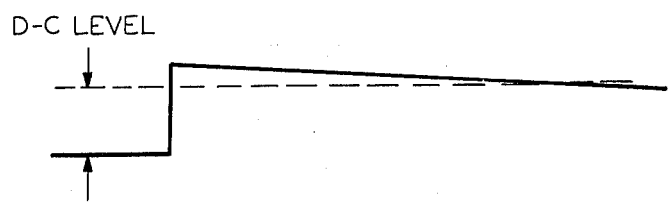
FIGS. 4C and 4D are graphs showing the output waveforms of the second synchronous demodulating circuit when the high Q filter in FIG. 3 is used and when it is not used, respectively.
Figure 4D:
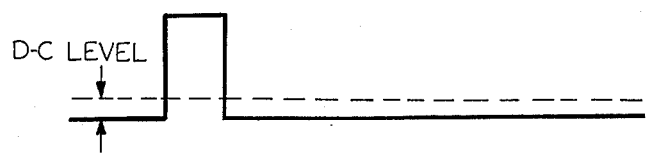

A high Q filter, such as a quartz crystal filter, is coupled to the amplifier 4 and precedes the second synchronous demodulating circuit 5. When said high Q filter 20 is supplied with a signal as shown in FIG. 4A which is the output of said amplifier 4, the input of which is supplied from the gate circuit 3, it is excited at its resonant frequency in response to the gated chrominance signal and continues to oscillate with an exponentially decaying amplitude after the excitation is removed as shown in FIG. 4B. Referring to FIGS. 4C and 4D, there are shown the output waveforms of the second synchronous demodulating circuit when said high Q filter is used and when it is not used, and the D-C output levels are represented by dotted lines. The additional high Q filter causes the D-C output to be larger.

Furthermore, another additional part is provided in the block diagram of FIG. 3 in order to protect against mistaking a hue of red or reddish color for a hue of flesh-color. This error is quite possible because the hue of flesh-colors are adjacent to the hue of red or reddish colors in the subcarrier phase diagram and persons frequently wear red or reddish clothes or there is a red background in a televised color picture.

Referring to FIG. 3, protection means 21 and 22 are provided in which protection is achieved by use of differences of luminance levels between flesh-colors and red or reddish colors. A luminance signal is applied to an input terminal 21a from a luminance amplifier and is fed into a luminance signal gate 21. Said luminance signal gate 21 produces as an output only a luminance signal which is less than a specified threshold level. The output signal of said luminance signal gate 21 is supplied to a subtracting circuit 22 connected between the first synchronous demodulating circuit 8 and amplifier 9, and is subtracted from the output signal of the first synchronous demodulating circuit 8. The input levels of said subtracting circuit 22 are adjusted so that the gated luminance signal for red colors results in cancelling the demodulated output signal for red colors at the output of said subtracting circuit 22.

The luminance signal for flesh-colors is greater than that of red or reddish colors and is not transferred from said luminance signal gate 21 to said subtracting circuit 22. Therefore, the output signal of said first synchronous demodulating circuit 8 for flesh-colors is fed to the pulse forming circuit 10 without any cancellation so that the extraction of flesh-colors in said gate circuit 3 keyed by the output pulse of said pulse forming circuit 10 is protected from mistaking red or reddish colors for flesh colors. The other parts of the circuit arrangement of FIG. 3 are the same as those of FIG. 1. When the amplitude of the output signal of the variable phase shifting network 11 is varied with the change of the amount of shifting of the phase, it will be better to place the variable phase shifting network 11 after the reference signal generator 13 rather than prior to the burst separator.

Figure 5:
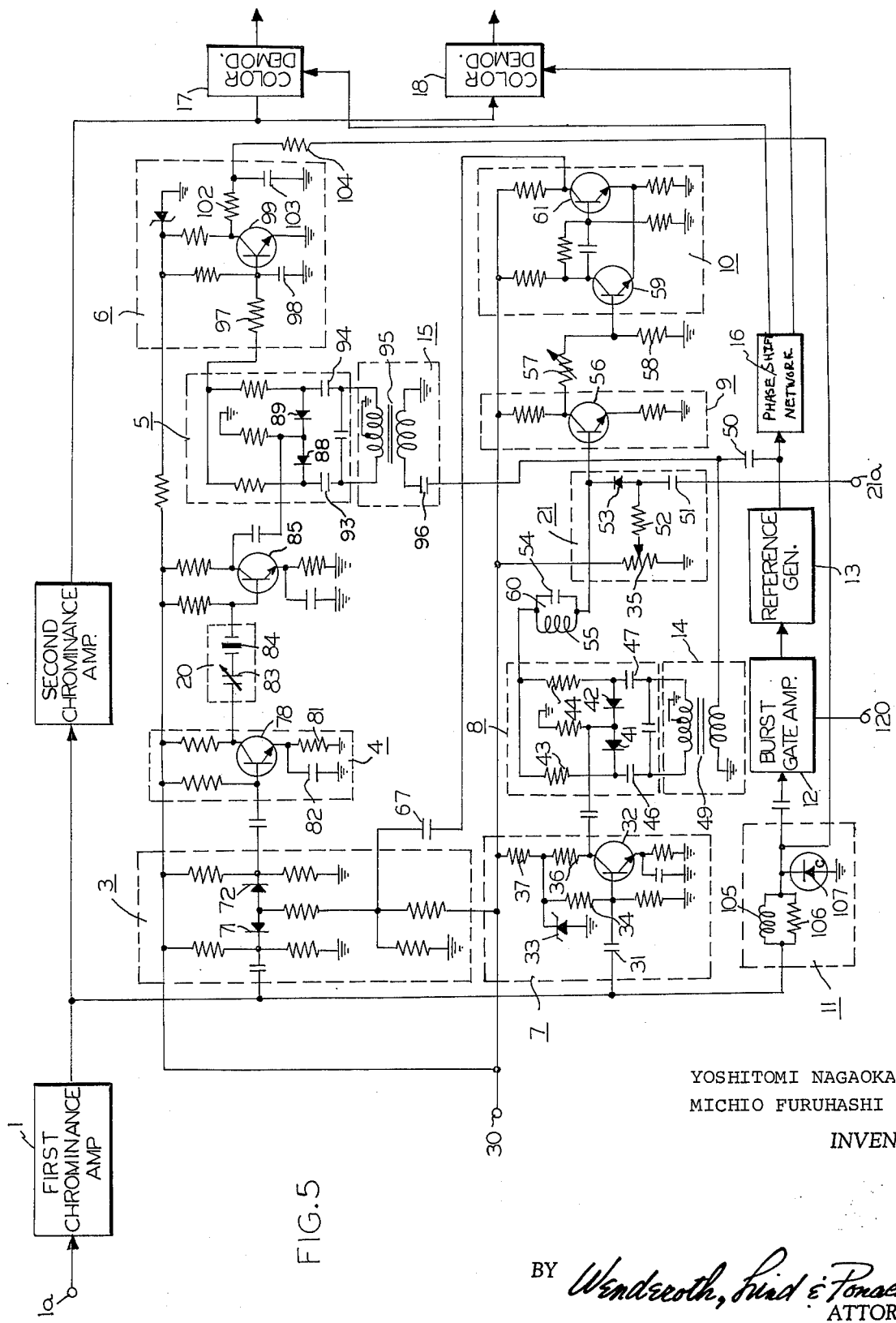
FIG. 5 is a block diagram similar to that of FIG. 3 in accordance with the present invention.

FIG. 5 shows still another version of the present invention; wherein identical reference characters designate identical blocks to those of FIG. 1 or FIG. 3. The circuitry in FIG. 5 differs from that in FIG. 3 in that (a) the voltage controlled variable phase shifting network 11 responsive to the output signal of the low pass filter network 6 is provided after the reference signal generator 13 and (b) the gate circuit 3 is provided after the amplitude limiting circuit 7. Further, in order to clarify the relation of the present invention to the prior art, the block diagram of the APC reference signal generator 13 comprising a phase detector 13a, a low pass network 13b and a voltage controlled crystal oscillator 13c is shown in FIG. 5.

Referring to FIG. 6 there is shown a schematic circuit diagram of the automatic hue-control apparatus for a color television receiver which shows one practical embodiment according to the principles of the present invention. In FIG. 6 the blocks identical with those of FIG. 3 are indicated by identical reference characters and are surrounded by a dotted line. A chrominance signal derived from the first chrominance amplifier 1 is applied to the base electrode of transistor 32 through a capacitor 31. Transistor 32 and its associated components function as the limiting circuit 7 which restricts the peak-to-peak amplitude of the chrominance signal so that it is constant. In order to provide an effective limiting function, a resistor 37 and zener diode 33 are connected in series between a power source 30 and ground, and the collector and base electrodes of transistor 32 are connected through resistors 36 and 34 respectively to the junction of resistor 37 and Zener diode 33 to supply a lower potential than that of said power source 30 thereto. The output of said limiting circuit 7 is supplied to the first demodulating circuit 8 which is a balanced phase detector comprising diodes 41 and 42 connected in series across the secondary bi-filar winding of a transformer 49 through capacitors 46 and 47, respectively. The primary circuit of said transformer 49 including a capacitor 50 forms the phase-shifting network 14 designed to provide the correct phase relationship of the reference signal for feeding said first synchronous demodulating circuit 8. Resistors 43 and 44 are connected in series across the ends of the series connected diodes 41 and 42. The output signal developed at the junction of resistors 43 and 44 is fed through a tank circuit comprising a capacitor 54 and an inductor 55 to an amplifier 9, comprising a transistor 56, the base electrode of which is connected to said tank circuit, and a luminance signal gate 21. A luminance signal having a wave form the polarity of which is black positive is supplied through the input terminal 21a to said amplifier 9 by way of the luminance signal gate 21 which comprises a capacitor 51 connected in series with a diode 53 with a resistor 52 connected to the junction between capacitor 51 and diode 53. The other end of resistor 52 is connected to a potentiometer 35 which is coupled between the power source 30 and ground, and which is used to adjust the biasing voltage of said diode 53 for setting a suitable threshold level. A luminance signal whose amplitude is more positive than the threshold level is transferred to the junction among the base electrode of transistor 56, the tank circuit 60 and the diode 53, and is thereafter subtracted from the demodulated output of the first synchronous demodulating circuit 8, because the polarity of the demodulated output for red color is opposite to that of the gated luminance signal.

The output signal of said amplifier 9 is divided by resistors 57 and 58 connected in series between the collector electrode of transistor 56 and the ground. The divided signal across resistor 58 is applied to the pulse forming circuit 10 which is in the form of a Schmitt triggering circuit comprising transistors 59 and 61. Resistor 57 is adjustable and serves to control the threshold or triggering level of said Schmitt triggering circuit 10. This level is adjusted so that transistor 59 is cut off and transistor 61 is full "on" in the normal state, that is when a demodulated output voltage across resistor 58 does not correspond to that for flesh-colors. A more positive voltage than the threshold level at the base electrode of transistor 59 switches the Schmitt triggering circuit into the quasi-stable state; said transistor 59 is driven into its active region, and the voltage drop at its collector turns transistor 61 to the "off" condition.

When transistor 61 turns "off", a positive pulse is applied through a capacitor 67 from said Schmitt triggering circuit 10 to the gate circuit 3 comprising diodes 71, 72 and their associated resistors which provide reverse bias voltages for said diodes 71 and 72. Because the positive pulse produces forward biases for said diodes 71 and 72, said diodes are conductive and allow the transmission of a chrominance signal from said first chrominance amplifier 1 to the amplifier 4. Said amplifier 4 comprises a transistor 78 and a resistor 81 and a capacitor 82 connected in parallel between the ground and the emitter electrode, whereby a high pass filter characteristic is obtained in the amplifier 4.

The output of said amplifier 4 is fed to the high Q filter 20 comprising a quartz crystal 84 and a capacitor 83. Said capacitor 83 is variable to enable tuning the quartz crystal 84 to the correct resonant frequency. Said high Q filter 20 is excited by the gated chrominance signal and provides a damped osciallating signal which is supplied to a buffer amplifier comprising a transistor 85. The output signal of the buffer amplifier is fed to the second synchronous demodulating circuit 5 which comprises two diodes 88 and 89 connected in series across the secondary bi-filar windings of a transformer 95 through capacitors 93 and 94, respectively. This circuit arrangement is similar to that of said first synchronous demodulating circuit 8. The primary winding of said transformer 95 and capacitor 96 form the phase-shifting network 15 designed to provide the correct phase relationship of the reference signal applied to said second synchronous demodulating circuit 5. The demodulated output signal is fed into an amplifier which serves as a low pass filter 6. Said amplifier comprises a transistor 99, the input base and output collector electrodes of which are coupled with low pass filter networks, respectively. The input low pass filter comprises resistor 97 and capacitor 98 and the output low pass filter comprises resistor 102 and capacitor 103.

An isolating resistor 104 is connected between said low pass filter 6 and the junction between a voltage variable capacitor 107 and a parallel circuit comprising an inductor 105 and a resistor 106 which constitutes the voltage controlled phase-shifting network 11. Supply of the signal from the low pass filter 6 to the phase shifting network 11 controls the phase of the chrominance signal supplied from said first chrominance amplifier 1 in accordance with a variation of the control signal.

The operation of this automatic control circuit is as follows. At first, assuming that a chrominance signal for flesh colors of a picture has the desired relation with respect to the reference signal which is generated from the burst signal in the reference generator 13, the output signal of said low pass filter network 6 is at a preselected voltage level which corresponds to the voltage to hold the middle of the variable capacitance range of said voltage variable capacitance diode 107. This means that the voltage controlled phase-shifting network 11 operates at the middle of the variable phase-shifting range. If the chrominance signal for flesh colors is not in the desired relationship with the reference signal, the control signal, that is the output signal of said low pass filter 6, changes from that obtained under the desired conditions. This change in the control signal is converted into a change of capacitance of said variable capacitor 107, and also into a change of the phase of the burst signal. This cange causes a shift in the phase of the reference signal with respect to that of the chrominance signal, so that the desired phase relation is restored.

The automatic hue-control circuit of FIG. 5 can be embodied by employing, for example, the following specified components:

| | |
|---|---|
| Capacitor 31 | 18pF |
| Transistor 32 | Silicon transistor 2SC269 |
| Zener diode 33 | RD5A |
| Resistor 34 | 6.8 kΩ |
| Resistor 35 | 5 kΩ |
| Resistor 36 | 680 Ω |
| Resistor 37 | 10 kΩ |
| Diodes 41 and 42 | Germanium diodes OA90 |
| Resistors 43 and 44 | 1 kΩ |
| Capacitors 46 and 47 | 39 pF |
| Capacitor 50 | 39 pF |
| Capacitor 51 | 0.1 μF |
| Resistor 52 | 10 kΩ |
| Diode 53 | Germanium diode OA90 |
| Capacitor 54 | 150 pF |
| Inductor 55 | 120 μH |
| Transistor 56 | Silicon transistor 2SC828 |
| Resistor 57 | 10 kΩ |
| Resistor 58 | 10 kΩ |
| Transistors 59 and 61 | Silicon transistors 2SC828 |
| Capacitor 67 | 10 μF |
| Diodes 71 and 72 | Germanium diodes OA90 |
| Transistor 78 | Silicon transistor 2SC829 |
| Resistor 81 | 1 kΩ |
| Capacitor 82 | 800 pF |
| Capacitor 83 | 100 pF |
| Quartz crystal 84 | MEW 616-6 |
| Transistor 85 | 2SC829 |
| Diodes 88 & 89 | Germanium diodes OA90 |
| Capacitors 93 and 94 | 39 pF |
| Capacitor 96 | 33 pF |
| Resistor 97 | 10 kΩ |
| Capacitor 98 | 0.33 μF |
| Transistor 99 | 2SC828 |
| Resistor 102 | 22 kΩ |
| Capacitor 103 | 0.33 μF |
| Resistor 104 | 22 kΩ |
| Inductor 105 | 22 μH |
| Resistor 106 | 2.2 kΩ |
| Voltage variable capacitance diode 107 | Hyper abrupt junction Si diode GW-11 |
| Supply voltage 30 | 24 volts. |

The vector A, as shown in FIG. 2A, is displaced clockwise by an angle of 45° from the burst signal and the angles of a sector surrounding the vector A are plus and minus 30°. These angles should not be construed as limitative, but will be selected as the most effective angles, respectively, for extracting flesh colors.

While the invention is shown as being a transistor circuit, it is equally possible to make it in the form of a tube-type circuit. Furthermore, the principles of operation are applicable if the variable phase-shifting means is provided for modifying the phase of the reference signal itself or the chrominance signal instead of the burst signal, as mentioned with reference to FIGS. 1, 3, 5 and 6. Further, while the connection of the gate circuit 3 forming part of said signal extracting means is shown in FIGS. 1, 3 and 5 as being directly to the chrominance amplifier 1, it will be understood that the connection can be an indirect connection through the limiting circuit 7, whereby an amplitude-limited chrominance signal is gated by said gate circuit.

Thus, the present invention provides a new and improved automatic hue-control apparatus for a color television receiver. This improved apparatus keeps the reproduced color for flesh as the memory-color for flesh without having any bad effect on other colors and eliminates the need to adjust the manual hue-control of the set after program changes or when switching cameras or when switching channels.

While a particular embodiment of the present invention has been shown and described, it is apparent that changes and modifications may be made therein without departing from the spirit or scope thereof.

What is claimed:

1. An automatic hue-control apparatus for use in a color television receiver having a luminance channel for delivering a luminance signal, a chrominance channel for delivering a chrominance signal, a burst separator for delivering a burst signal from the chrominance signal, a reference signal generator for supplying a reference signal and a phase shifter for reference setting to obtain desired demodulation axes, said automatic hue-control apparatus comprising:
    a signal extracting means coupled to said chrominance channel for extracting signal components for flesh color from said chrominance signal;
    a phase error detecting means coupled to said signal extracting means for detecting the phase error between the output signal of said signal extracting means and a subcarrier reference signal which is in phase quadrature to the phase of memory-color for flesh to produce an error signal indicative of the phase relation between said output signal and said reference signal; and
    a voltage controlled variable phase shifting means coupled to said phase error detecting means and supplied with the output signal thereof to correct the phase error between the chrominance signal and the subcarrier reference signal.

2. An automatic hue-control apparatus as claimed in claim 1 wherein said voltage controlled variable phase shifting means is connected between said chrominance channel and said burst separator.

3. An automatic hue-control apparatus as claimed in claim 1 wherein said voltage controlled variable phase shifting means is connected between said reference signal generator and said phase shifter for reference setting.

4. An automatic hue-control apparatus as claimed in claim 1 wherein said signal extracting means comprises:
    an amplitude suppressor coupled to said chrominance channel for suppressing the amplitude of a chrominance signal larger than the chrominance signal having a flesh hue;
    a synchronous demodulating means coupled to said amplitude suppressor and which synchronously demodulates the the output signal of said amplitude suppressor with the reference signal having a predetermined demodulation axis;
    a pulse forming means coupled to said synchronous demodulating means for delivering a pulse signal coinciding with the flesh color signal; and
    a first gate circuit means coupled to said chrominance channel and to which the output of said pulse forming means is coupled to separate the flesh color signal components from said chrominance signals.

5. An automatic hue-control apparatus as claimed in claim 4, wherein said predetermined demodulation axis corresponds to the phase of flesh color.

6. An automatic hue-control apparatus as claimed in claim 4, wherein said signal extracting means further comprises:
    a second gate circuit means coupled to said luminance channel for transferring the luminance signal which is less than a specified level; and
    a subtracting means having inputs coupled to the output of said synchronous demodulating means and the output of said second gate circuit means and having an output coupled to said pulse forming means for supplying differential signals between the output signal of said synchronous demodulating means and the output signal of said second gate circuit means to said pulse forming means.

7. An automatic hue-control apparatus as claimed in claim 6 wherein said specified level is representative of a luminance level for flesh color.

8. An automatic hue-control apparatus as claimed in claim 1 wherein said signal extracting means comprises:
    an amplitude suppressor coupled to said chrominance channel for suppressing the amplitude of a chrominance signal larger than the chrominance signal having a flesh hue;
    a synchronous demodulating means coupled to said amplitude suppressor and which synchronously demodulates the output signal of said amplitude suppressor with the reference signal having a predetermined demodulation axis;
    a pulse forming means coupled to said synchronous demodulating means for delivering a pulse signal coinciding with the flesh color signal; and
    a first gate circuit means coupled to said amplitude suppressor and to which the output of said pulse forming means is coupled to separate the flesh color signal components from said chrominance signals.

9. An automatic hue-control apparatus as claimed in claim 8, wherein said predetermined demodulation axis corresponds to the phase of flesh color.

10. An automatic hue-control apparatus as claimed in claim 8, wherein said signal extracting means further comprises:
    a second gate circuit means coupled to said luminance channel for transferring the luminance signal which is less than a specified level; and
    a subtracting means having inputs coupled to the output of said synchronous demodulating means and the output of said second gate circuit means and having an output coupled to said pulse forming means for supplying differential signals between the output signal of said synchronous demodulating means and the output signal of said second gate circuit means to said pulse forming means.

11. An automatic hue-control apparatus as claimed in claim 10 wherein said specified level is representative of a luminance level for flesh color.

12. In a color television system, the method of altering the hue parameter in a delivered signal comprising the steps of detecting the value of said parameter at which a time average characteristic of said delivered signal occurs and processing said signal so that said value represents a predetermined hue.

13. In a color television receiver of the type including processing circuitry responsive to chrominance signals contained in a color television signal, said receiver including a color reference oscillator and a color demodulator, said demodulator being responsive to said chrominance signals and said color reference oscillator to produce at an output demodulated color signals, the combination comprising,
- a. first means responsive to said chrominance signals for detecting chrominance components having a phase indicative of flesh-tone hues and for providing an output signal representative thereof,
- b. second means responsive to said output signal for filtering said chrominance components therefrom to provide a control signal and
- c. third means responsive to said control signal for dynamically shifting the phase of waves from said color oscillator when a chrominance signal having a phase representative of hues in the vicinity of flesh tones is detected.

* * * * *